(12) United States Patent
Ore (10) Patent No.: US 8,387,737 B2
(45) Date of Patent: Mar. 5, 2013

(54) MOTORCYCLE SUSPENSION METHOD AND SWAY DAMPENING APPARATUS

(76) Inventor: Jeremy Ore, Santee, CA (US)

( * ) Notice: Subject to any disclaimer, the term of this patent is extended or adjusted under 35 U.S.C. 154(b) by 438 days.

(21) Appl. No.: 12/637,699

(22) Filed: Dec. 14, 2009

(65) Prior Publication Data

US 2010/0089683 A1   Apr. 15, 2010

Related U.S. Application Data

(63) Continuation-in-part of application No. 12/154,456, filed on May 22, 2008, now Pat. No. 7,967,097.

(51) Int. Cl.
*B62K 25/04* (2006.01)
(52) U.S. Cl. .......................... 180/229; 280/284; 384/255
(58) Field of Classification Search .................. 180/227, 180/228; 280/284, 285, 275; 384/255, 299, 384/265; 267/258
See application file for complete search history.

(56) References Cited

U.S. PATENT DOCUMENTS

| | | | | |
|---|---|---|---|---|
| 3,616,870 A * | 11/1971 | Kramer | ......................... | 180/227 |
| 4,237,744 A * | 12/1980 | Jolly | ............................. | 474/116 |
| 4,614,507 A * | 9/1986 | Ishino | ............................. | 474/101 |
| 6,131,684 A * | 10/2000 | Ticknovich | ................... | 180/227 |
| 7,967,097 B2 * | 6/2011 | Ore | ................................ | 180/227 |
| 2009/0208155 A1 * | 8/2009 | Blane | ............................. | 384/299 |

* cited by examiner

*Primary Examiner* — Anne Marie M Boehler
(74) *Attorney, Agent, or Firm* — Steins & Associates, P.C.

(57) ABSTRACT

A Motorcycle Suspension Method and Sway Dampening Apparatus. Rather than selectively replacing portions of the prior motorcycle dampening apparatus, the apparatus and method of the present invention replaces the conventional dampening bushing within the OEM pivot shaft assembly. The replacement combination motor mount and bushing provides at least the same durability and dampening capability the OEM device, while eliminating the "wobble" experienced by virtually all OEM motorcycles having the prior rear pivot mount design. The replacement mount and bushing element comprises at least two different plasticized materials combined into a single element. The combination mount and bushing is made partially from a softer, pliable dampening material, as well as a more durable and hard material. Installation of the combination mount and bushing element eliminates the need for an asymmetric pivot shaft orientation, since the central bore of this element is centered on the geometric axis of the element.

12 Claims, 11 Drawing Sheets

MOTORCYCLE SUSPENSION METHOD AND SWAY DAMPENING APPARATUS

This application is a continuation-in-part of application Ser. No. 12/154,456, filed May 22, 2008, (the "Parent Application"), now U.S. Pat. No. 7,967,097.

BACKGROUND OF THE INVENTION

1. Field of the Invention

This invention relates generally to motorcycles and, more specifically, to a Motorcycle Suspension Method and Sway Dampening Apparatus.

2. Description of Related Art

The popularity of motorcycling continues to increase. Riders are attracted to the freedom of the open road, leaving behind the cares and worries of everyday life. Motorcycle manufacturers have seized upon the recent surge in popularity and have been selling motorcycles and accessories in record numbers.

However, statistics show that motorcycles are generally more dangerous than automobiles. For example, certain Harley-Davidson motorcycle models exhibit what is commonly referred to as a "high-speed wobble" (or "tank-slapper") which typically involves shaking or instability. Specifically, the front wheel can thrash from side to side, something motorcycle riders refer to as a "tank slapper" because the handlebars suddenly seem intent on battering the fuel tank into submission, causing the rider to lose control of the motorcycle.

Certain Harley-Davidson motorcycle models appear to be more prone to the problem than others. The "FLH" series of Harley-Davidson motorcycles, also frown as the Electra Glide, Road King and Ultra Classic, which are widely used by law enforcement officers nationwide have been documented as being prone to instability. "A Harley, when you get it to high speed, has what you call a high-speed wobble," Sgt. R. N. Stallings of the North Carolina Highway Patrol has been quoted as stating. In an otherwise glowing article in 1999, Motorcycle Consumer News described "an oscillation in the chassis that keeps the bike from feeling steady, both while cornering and at elevated speeds."

The parent invention, which is the subject of the Parent Application, went a long way in curing the high speed wobble that is well known to the riders of HD motorcycles. Because the parent invention does not stand on its own, but rather builds upon the existing OEM rubber mount, the Parent Invention has not been one hundred percent successful. In certain cases, after the retrofit of the OEM pivot mounting system with the asymmetric bushing of the parent invention, it was noted that certain ride characteristics were not fully resolved. What was needed was a device that completely replaces the OEM elements responsible for permitting the high-speed wobble.

Therefore, there remains a need to overcome the problem of instability in Harley Davidson motorcycles. The discussion of the background to the invention included herein is included to explain the context of the invention. This is not to be taken as an admission that any of the material referred to was published, known, or part of the common general knowledge at the priority date of the claims.

SUMMARY OF THE INVENTION

In light of the aforementioned problems associated with the prior devices and methods, it is an object of the present invention to provide a Motorcycle Suspension Method and Sway Dampening Apparatus. Rather than selectively replacing portions of the prior motorcycle dampening apparatus, the apparatus and method of the present invention should replace the conventional dampening bushing within the OEM pivot shaft assembly. The replacement combination motor mount and bushing should provide at least the same durability and dampening capability the OEM device, while eliminating the "wobble" experienced by virtually all OEM motorcycles having the prior rear pivot mount design. The replacement mount and bushing element should comprise at least two different plasticized materials combined into a single elements. The combination mount and bushing should partially be made from a softer, pliable dampening material, as well as a more durable and hard material. Installation of the combination mount and bushing element should further eliminate the need for an asymmetric pivot shaft orientation, since the central bore of this element is centered on the geometric axis of the element.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Motorcycle Suspension Method and Sway Dampening Apparatus.

In the following paragraphs, a stability suspension system ("SSS") kit, apparatus and method will be described in detail by way of example with reference to the attached drawings. While the SSS is capable of embodiment in many different forms, there is shown in the drawings and will herein be described in detail specific embodiments, with the understanding that the present disclosure is to be considered as an example of the principles of the SSS and not intended to limit the SSS to the specific embodiments shown and described. That is, throughout this description, the embodiments and examples shown should be considered as exemplars, rather than as limitations on the SSS. As used herein, "SSS" refers to any one of the embodiments of the invention described herein, and any equivalents. Furthermore, reference to various feature(s) of the SSS throughout this document does not mean that all claimed embodiments or methods must include the referenced feature(s).

Motorcycles have been in production for over 100 years, built by manufacturers such as Aprilla, BMW, Buell, Ducati, Harley-Davidson, Honda, Indian, Kawasaki, Moto Guzzi, Suzuki, Triumph, Victory, Yamaha, and others. It will be appreciated that the present invention may be installed on one or more of the motorcycle models or types built by the above-listed manufacturers, or other un-named manufacturers (some, or all of the above-listed manufacturer names may be registered trademarks of their respective owners).

One manufacturer that has become very popular in the United States, as well as through-out the world, is Harley-Davidson. Harley-Davidson manufactures many different models of motorcycles, which may be generally categorized into five different types: Touring models, Softail models, Sportster models, Dyna Glide models, and V-Rod models (Harley-Davidson is a registered trademark of H-D Michigan, Inc., of Ann Arbor Mich.).

For example, touring models may include the FLHT Electra Glide standard, FLHTC Electra Glide classic, FLHTCU Ultra Classic Electra Glide, FLHTP Electra Glide police, FLHS Electra Glide sport, FLHR Road King, FLHRC Road King classic, FLIP Road King police, FLTC Tour Glide classic, FLTCU Ultra classic tour Glide, FLTR Road Glide, FLHRS Road King custom, FLTRI Road King, FLHRCI Road King custom, FLHRCI Road King classic, FLTRI Road Glide, FLHTI Electra Glide standard, FLHTCI Electra Glide classic, the FLHTCUI Ultra Classic Electra Glide, and other models (some or all of the above model names may be registered trademarks of H-D Michigan, Inc., of Ann Arbor Mich.).

Sportster models may include the Sportster XL883, Sportster XL883L, Sportster XL883C, Sportster XL883C custom, Sportster XL883R, Sportster XLH883, Sportster XLH883 Hugger, Sportster XLH883 Deluxe, Sportster XL1200C, Sportster XL1200C custom, Sportster XL1200R, Sportster XL1200R Roadster, Sportster XLH1200, the Sportster 1200S Sport, and other models (some or all of the above model names may be registered trademarks of H-D Michigan, Inc., of Ann Arbor Mich.).

Dyna Glide models may include the FXD Dyna Super Glide, FXDX Dyna Super Glide sport, FXDXT Dyna Super Glide T-sport, FXDL Dyna Low Rider, FXDP Dyna Defender, FXDS-CONV Dyna Convertible, FXDWG Dyna Wide Glide, FXDC/I Super Glide Custom, FXDI Dyna Super Glide, FXDXI Dyna Super Glide sport, FXDCI Super Glide custom, FXDLI Dyna Low Rider, the FXDWGI Dyna Wide Glide, and other models (some or all of the above model names may be registered trademarks of H-D Michigan, Inc., of Ann Arbor Mich.).

V-Rod models may include the VRSCA V-Rod, VRSCB V-Rod, the VRSCR Street Rod, and other models (some or all of the above model names may be registered trademarks of H-D Michigan, Inc., of Ann Arbor Mich.).

Softail models may include the FXST Softail Standard, FXSTI Softail Standard, FXSTB Night Train, FXSTBI Night Train, FXSTSI Springer Softail, FXSTDI Deuce, FLSTF Fat Boy, FLSTFI Fat Boy, FLSTFI Fat Boy 15$^{th}$ Anniversary Special Edition, FLSTNI Softail Deluxe, FLSTSCI Softail Springer Classic, FLSTC Heritage Softail Classic, FLSTCI Heritage Softail Classic, FLSTN Heritage Softail Special, FLSTS. Heritage Springer, FXSTC Softail Custom, FXSTD Softail Deuce, FXSTS Springer Softail, the FXSTSB Bad Boy, and other models (some or all of the above model names may be registered trademarks of H-D Michigan, Inc., of Ann Arbor Mich.).

Clearly, Harley-Davidson manufactures many different motorcycle models. It will be appreciated that the present invention may be installed on one or more of the above-listed models, or on other models yet to be manufactured. In addition, the present invention may be installed on a "custom" motorcycle, which is a motorcycle that differs from a manufacturer produced model. For example, a custom motorcycle may be a Harley-Davidson FLHT Electra Glide standard that has bad specific parts either added, removed or modified. Or, a custom motorcycle may be built from scratch, using no, or very few pre-manufactured parts, such as only the engine, transmission and tires.

Some Harley-Davidson models have a rubber mounted engine with two mounts, permitting lateral deflection of the swing arm when subjected to side loads, which produces a characteristic wallow and a vague steering response, both of which are extremely detrimental to motorcycle stability and handling. Since at least as early as 1987, these, and other Harley Davidson motorcycle models, exhibit what is commonly referred to as a "high-speed wobble" (or "tank-slapper") which typically involves shaking or instability of the motorcycle. Specifically, the front wheel can thrash from side to side, something motorcycle riders refer to as a "tank slapper" because the handlebars suddenly seem intent on battering the fuel tank into submission, causing the rider to lose control of the motorcycle.

Certain Harley-Davidson motorcycle models appear to be more prone to the problem than others. The "FLIT" series of Harley-Davidson motorcycles, also known as the Electra Glide, Road King and Ultra Classic, which are widely used by law enforcement officers nationwide have been documented as being prone to instability. "A Harley, when you get it to high speed, has what you call a high-speed wobble," Sgt. R. N. Stallings of the North Carolina Highway Patrol has been quoted as stating. In an otherwise glowing article in 1999, Motorcycle Consumer News described "an oscillation in the chassis that keeps the bike from feeling steady, both while cornering and at elevated speeds."

Motorcycle aftermarket part manufacturers, tuners, home builders, and others have attempted to solve this long-felt, bit unresolved need to fix the Harley-Davidson motorcycle handling problem using several different approaches and methods resulting in many different products. However, these products either failed to solve the problem, or increased the engine and powertrain vibration transfer to the rider, thereby increasing the "buzzing" felt in the rider's hands and feet. So, after 20 years of trying, the Harley-Davidson motorcycle handling problem had yet to be fixed in a satisfactory manner.

Enter the SSS kit, apparatus and method described herein, which has solved this long-felt need, and achieved remarkable commercial success. Many accolades from independent third parties have been received by the inventor, including the following: "The Glide-Pro (i.e., the SSS) reduced the wobble effect without increasing vibration. This easy to install product still allows the motor to move front to back like it was designed to do, yet reduces the lateral flex that is often encountered on rubber mounted touring models." "In the 15 years we have been in business we have yet to come across anything like this. We think this IS IT!!! Finally!!!" "The Glide Pro (i.e., SSS) installation was a breeze . . . took about an hour. The results are amazing. My FLEX now corners like it's on rails. The rear suspension now works so well, I had to decrease the air pressure in my rear shocks at least 10 lbs. Great Product . . . you guys should send your website address to Harley Davidson so they can get a clue and do the right thing for the FLH series."

When installed; the SSS kit greatly improves motorcycle handling. All evidence of "wallow" or "tank slappers" in long sweeping corners is eliminated. The motorcycle also tracks much better in cross winds and grooved pavement. That is, one embodiment of the SSS kit will improve or substantially eliminate the handling problem associated with certain Harley-Davidson models. For example, the stability and ride quality of the FLH and FLT and other Harley-Davidson models is significantly improved when the SSS kit, described herein, is installed.

In one embodiment, the SSS kit substantially eliminates undesired swing arm movement, generally in the horizontal plane, which is known to cause the instability, or wobble described above. However, the SSS kit also allows the engine, transmission and other components to continue to move.

Figure 1:
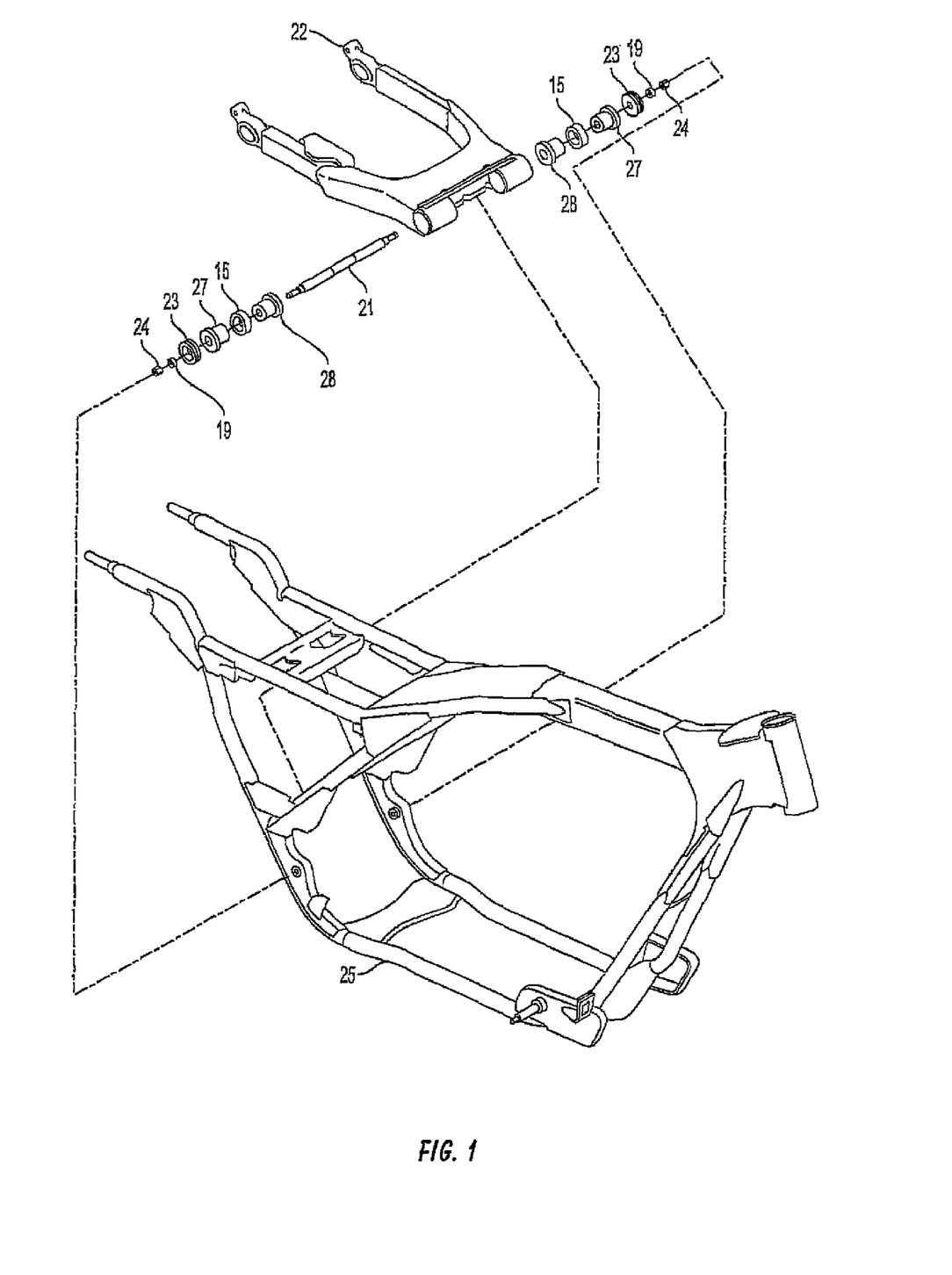
FIG. 1 is an exploded perspective view of a frame, swing arm, and other components of a motorcycle.
Figure 2:
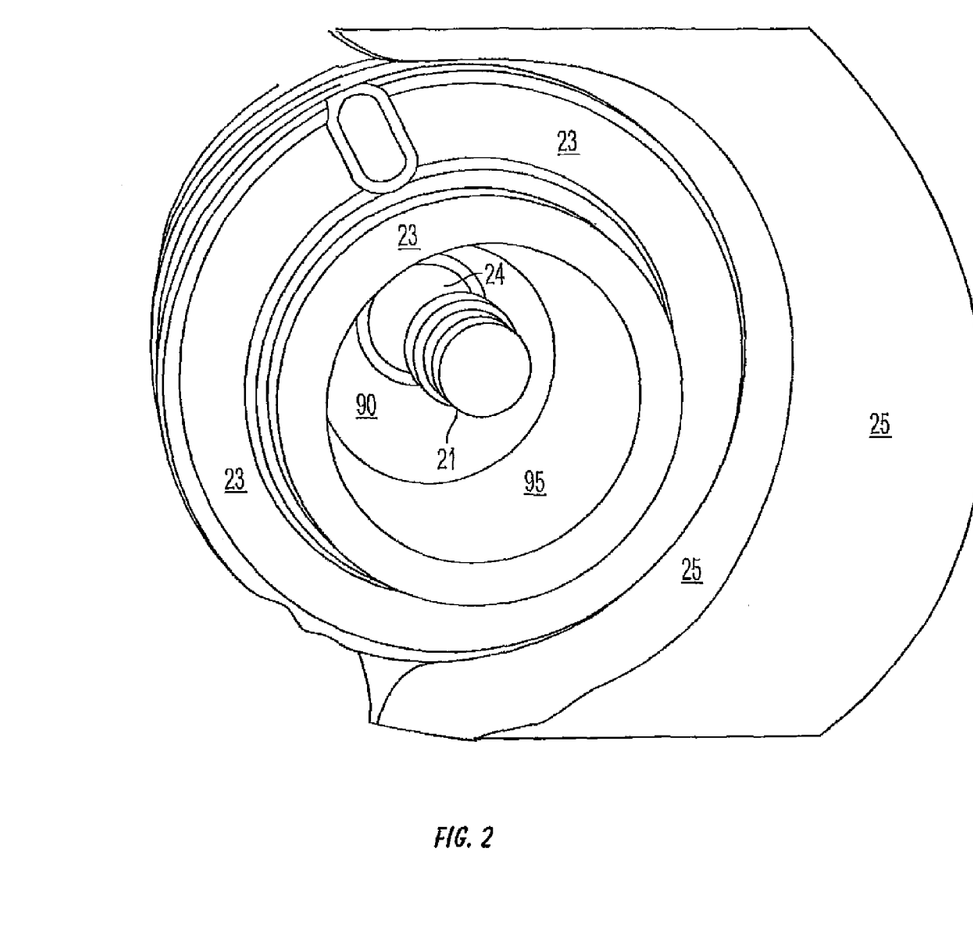
FIG. 2 is a perspective view of the motorcycle frame, "stock" swing arm pivot shaft, and rubber mount illustrated in FIG. 1.

Referring now to FIGS. 1-7, one embodiment of the stability suspension system 5 (hereinafter "SSS") will be described. FIG. 1 illustrates an exploded perspective view of components from a Harley-Davidson FLH touring model. As shown in FIGS. 1 and 2, a swing arm, or rear fork 22 is pivotally attached to motorcycle frame 25 by several components, including: pivot shaft 21; inner spacer 28; bearing 15; outer spacer 27; mounting element, or rubber mount 23; washer 19; and nut 24. Ideally, the swing arm 22 should only pivot about the pivot shaft 21 so that the end of the swing arm 22 (which mounts the rear wheel and tire, not shown) only moves in a vertical direction. However, in an effort to reduce vibration generated by the engine and transmission, the ends of pivot shaft 21 are mounted in mounting elements, or rubber mounts 23, allowing the shaft 21, and thus the swing arm 22 to move laterally, as well as vertically. But, any lateral movement of the rear tire (which is rotatably coupled to the swing arm 22) greatly reduces the stability of the motorcycle, causing the instability discussed above.

Referring now to FIGS. 3-7, one embodiment of the SSS 5 is illustrated. When installed, the SSS 5 greatly reduces, or substantially eliminates any lateral movement of the swing arm 22 (and thus rear tire), greatly increasing the stability of the motorcycle.

Figure 3:
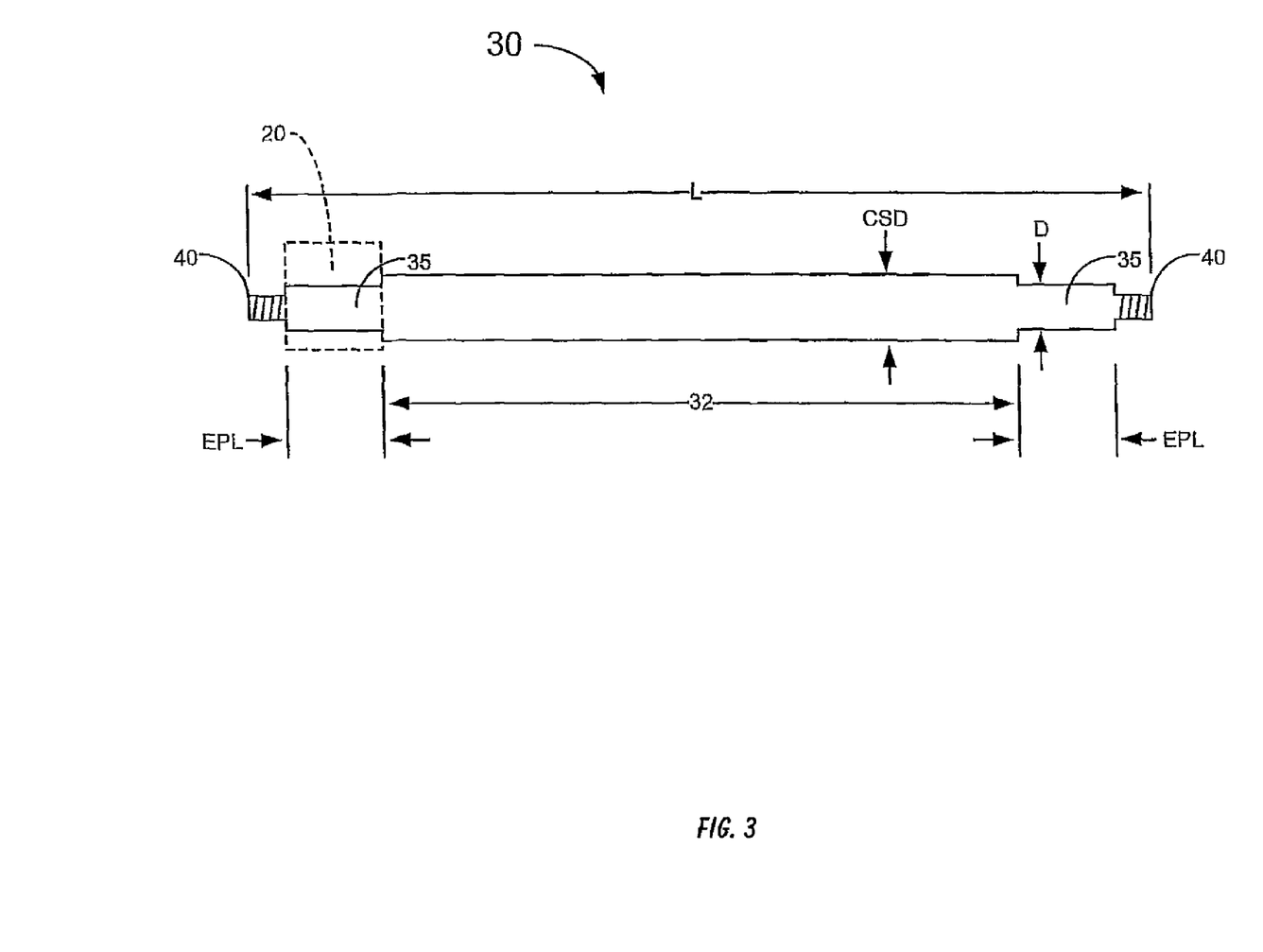
FIG. 3 illustrates a swing arm pivot shaft constructed according to one embodiment the parent invention.
Figure 4:
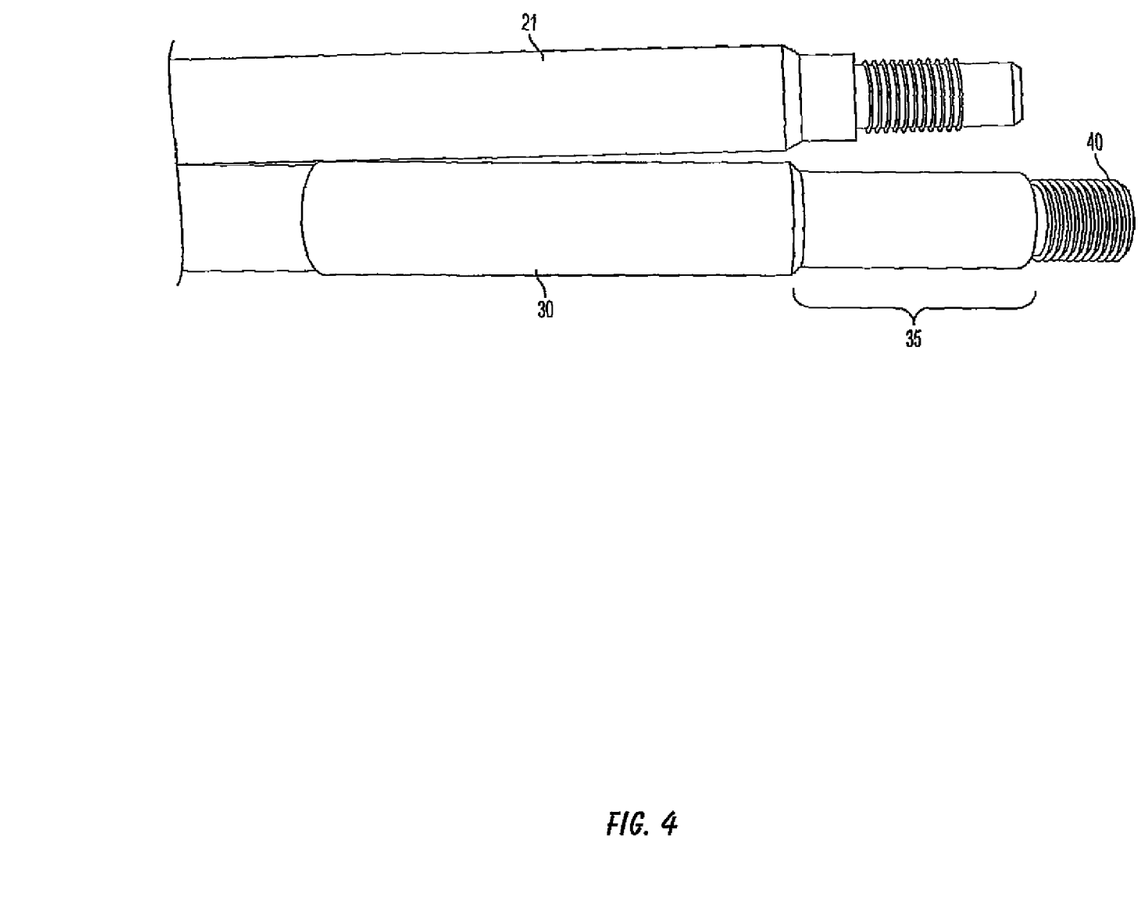
FIG. 4 illustrates the swing arm pivot shaft of FIG. 3 and the "stock" swing arm pivot shaft shown in FIGS. 1-2.
Figure 7:
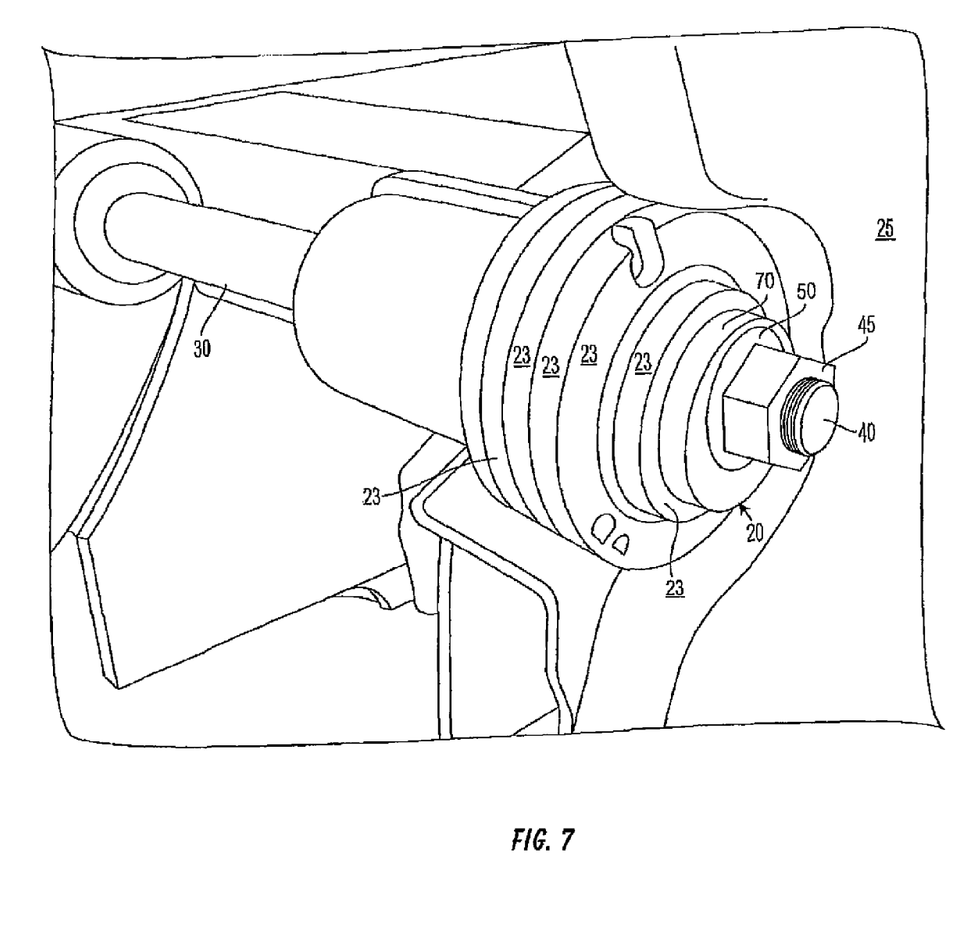
FIG. 7 is a perspective view of the motorcycle frame, replacement swing arm pivot shaft, rubber mount and asymmetric bushing illustrated in the above Figures.

One part of the SSS 5 kit is a replacement swing arm pivot shaft 30 that is installed in place of shaft 21, shown in FIGS. 3-4 and 7. In a preferred embodiment, the SSS 5 replacement swing ann pivot shaft 30 comprises a cylindrical, solid piece of stainless steel (17-4pH, also known as PH 17-4) that preferably is heat treated at about 1150 degrees F. This type of stainless steel has a high-tensile strength and is also extremely corrosion resistant. It will be appreciated that alternative steel types may be employed by the replacement swing arm pivot shaft 30.

A preferred embodiment of the replacement swing arm pivot shaft 30 is illustrated in FIGS. 3 and 4. In addition to being constructed of a superior grade of metal alloy, the replacement swing arm pivot shaft 30 is includes dimensions that differ from the stock, or "originally manufactured," pivot shaft 21.

Specifically, as shown in FIGS. 3 and 4, the replacement swing arm pivot shaft 30 includes a center section 32 that joins two end portions 35 that each comprise a mounting area for asymmetric bushing 20. In one embodiment, a center section diameter CSD may be about 0.75 of an inch, but in another embodiment the center section diameter CSD may be about 0.62 of an inch. It will be appreciated that other center section diameters CSD may be employed by the replacement swing arm pivot shaft 30.

As shown in FIG. 3, when compared to stock swing arm 21, each end portion 35 has an end portion length EPL that may be about 1.6 inches, but it will be appreciated that other end portion lengths EPL may be employed by the replacement swing arm pivot shaft 30. As illustrated in FIG. 4, when compared to stock swing arm 21, the replacement swing arm pivot shaft 30 has a shaft length SL that is longer than the stock swing arm 21. In one embodiment, the shaft length SL may be about 13.4 inches but it will be appreciated that other shaft lengths SL may be employed by the replacement swing arm pivot shaft 30. As also shown in FIG. 4, when compared to stock swing arm 21, the replacement swing arm pivot shaft 30 includes a diameter D of each end portion 35 that is greater than the stock swing arm 21. In one embodiment, the diameter D may be about 0.62 of an inch, but it will be appreciated that other diameters D may be employed by the replacement swing arm pivot shaft 30. Finally, each end portion 35 terminates in a threaded section 40 that includes threads for receiving a flanged nut 45, as shown in FIGS. 3 and 7.

One feature of the above-described dimensions of the replacement swing arm pivot shaft 30, which differ from the stock swing arm 21, is that the bending stiffness, or resistance to bending of the replacement swing arm pivot shaft 30 is greater than the stock swing arm 21, which contributes to reducing any undesired movement of the swing arm 22.

Figure 5:
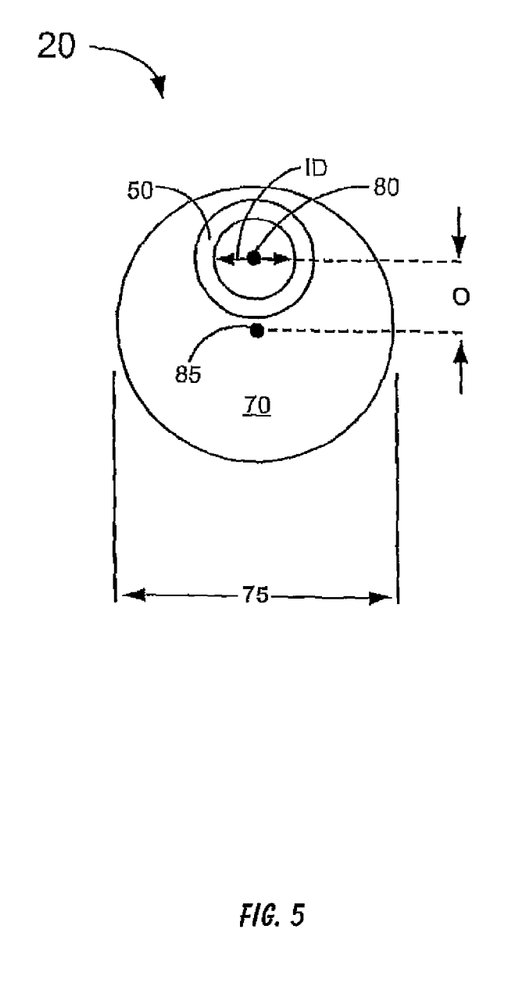
FIG. 5 illustrates an asymmetric bushing constructed according to one embodiment the parent invention.
Figure 6:
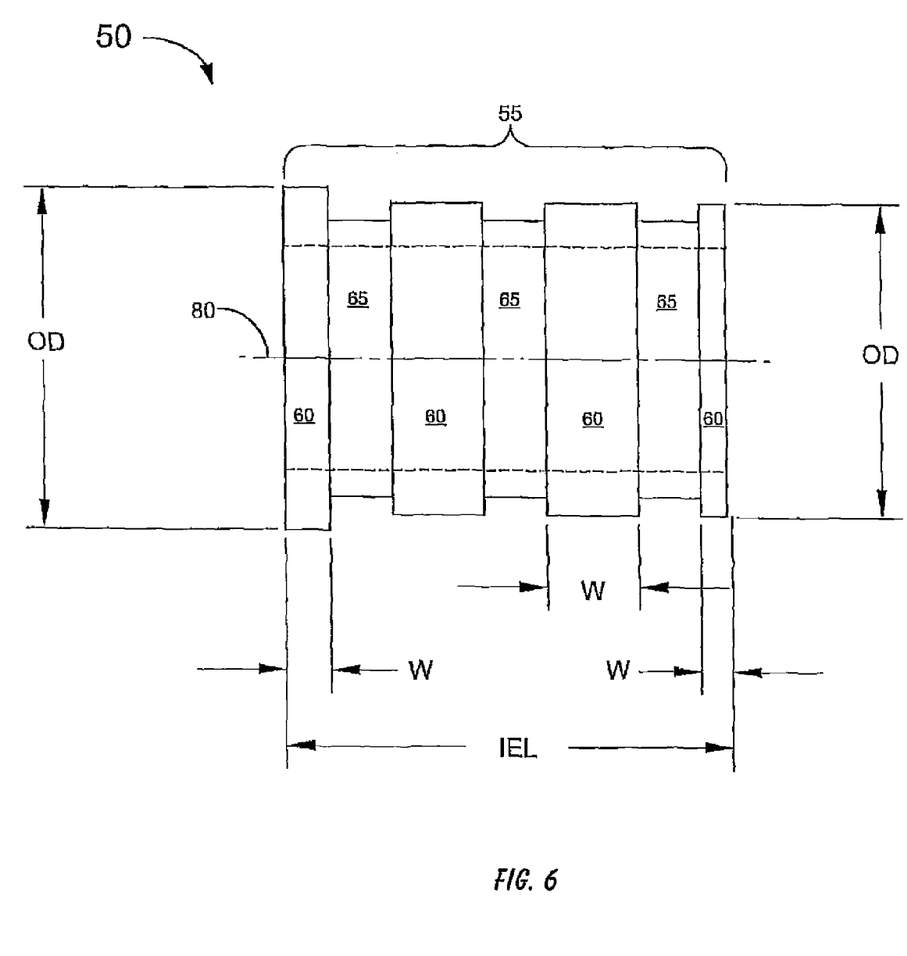
FIG. 6 illustrates an inner element of the asymmetric bushing of FIG. 5.

Referring now to FIGS. 5-7, the SSS 5 includes two asymmetric bushings 20, one of which is illustrated. In a preferred embodiment, the two asymmetric bushings 20 are substantially identical. Each asymmetric bushing 20 comprises an inner element or cylinder 50 having an inner element length IEL of about 1.25 inches and an inner diameter ID of about 0.62 inches. In one embodiment, the inner cylinder 50 comprises a bronze alloy of copper and tin that has been sintered with SAE 30 weight oil. One feature of the inner cylinder 50 is that heat created by the replacement swing arm pivot shaft 30 draws the oil to the inner cylinder 50 surface, enabling the oil to lubricate the interface between the inner cylinder 50 surface and the replacement swing arm pivot shaft 30, which reduces wear and any tendency to gall. It will be appreciated that other materials may be used to construct the inner cylinder 50.

As shown in FIGS. 5 and 6, in one embodiment, the inner element, or cylinder 50 comprises a substantially constant, or smooth inner diameter and a non-constant outer diameter 55. The inner diameter of the inner cylinder substantially matches the outer diameter of the end portions 35 of the replacement swing arm pivot shaft 30 so that one asymmetric bushing 20 can be fitted around each end portion 35.

Referring now to FIG. 6, in one embodiment, the non-constant outer diameter 55 comprises several radial flanges, or elevated sections 60, each having an outer diameter greater than an adjacent non-elevated section 65. For example, in the embodiment illustrated in FIG. 6, four elevated sections 60 are separated by three non-elevated sections 65. A width W of each elevated section 60 may vary, with one elevated section 60 having a width W of about 0.25 of an inch, and another elevated section 60 having a width W of about 0.10 of an inch. It will be appreciated that the number of elevated sections 60 may vary, as well as the width W of each elevated section 60. The outer diameter OD of the elevated sections 60 may also vary, with one elevated section 60 having an outer diameter OD of about 0.95 of an inch and another elevated section 60 having an outer diameter OD of about 0.90 of an inch. It will be appreciated that the outer diameter OD of the elevated sections 60 may vary. In another embodiment, one or more of the elevated sections 60 may include a "knurled", textured, or otherwise non-uniform surface.

Another embodiment of the inner cylinder 50 may comprise a substantially constant, or smooth inner diameter as discussed above, and a non-constant outer diameter 55 comprising two radial flanges or elevated sections 60, each having an outer diameter greater than an adjacent non-elevated section 65. In this embodiment, the two radial flanges or elevated sections 60 are located at the distal ends of the inner cylinder 50, with the portion between the distal ends comprised of a constant outer diameter. Referring to FIG. 6, the elevated sections 60 located at each end of the inner cylinder 50 would be the only elevated sections 60, with the area between the distally-located elevated sections 60 comprising one continuous non-elevated section 65.

As shown in FIG. 5, surrounding the inner cylinder 50 is outer member or element 70. In one embodiment, outer element 70 has a substantially circular perimeter and is comprised of a material having a durometer (A scale) of 35, but the material may range from a durometer hardness reading of 20 to a durometer hardness reading of 50 (both A scale). Generally "durometer" is one of several ways to indicate the hardness of a material, and is defined as the material's resistance to permanent indentation. The term durometer is often used to refer to the measurement, as well as the instrument itself Durometer is typically used as a measure of hardness in polymers, elastomers and rubbers. There are several scales of durometer, used for materials with different properties. The two most common scales, using slightly different measurement systems, are the A and D scales. The A scale is for softer plastics, while the D scale is for harder ones.

In one embodiment, the outer element 70 is comprised of a polyurethane that is mixed in a 2 to 1 ratio. The outer element 70 may be comprised of RU-440 (manufactured by Silpak, Inc, of Pomona, Calif.) or any equivalents that provide a durometer range between 20 and 50. It will be appreciated that other urethanes, mixtures or combinations of urethanes, or polyurethanes may be employed that will best withstand the operating environment. For example, the outer element 70 may be comprised of at least one material selected from a group consisting of plastics, polymers, polyesters, polyolefins, polycarbonates, polyamides, polyethers, polyethylene, polytetrafluoroethylene, silicone, silicone rubber, rubber, polyurethane, DACRON, TEFLON, polyvinyl chloride, polystyrene, nylon, or latex rubber (DACRON and TEFLON are registered trademarks of E.I. du Pont de Nemours and Company of Wilmington, Del.).

For example, one embodiment of the outer element 70 comprises a urethane RTV. RTV stands for Room-Temperature Vulcanizing, which is a term for rubber compounds that solidify and stabilize at room temperature. Generally, RTV rubber is a two-part mixture that uses a chemical instead of heat for curing. Thus, one method of manufacturing the outer element 70 is to mix the urethane and curing product in a 2 to 1 ratio, and pour the mixture about the inner cylinder 50, which is located within a mold (not shown) so that an outer diameter of the outer element 70 is approximately 1.35 inches, and the height, or thickness of the outer member is about 1.25 inches so that it substantially matches the inner element length IEL. It will be appreciated that the process may vary, and the dimensions of the inner cylinder 50 and outer element 70 may also vary. As shown in FIG. 5, the combination of the inner cylinder 50 and outer element 70 comprise the asymmetric bushing 20. In a preferred embodiment, the "stepped" outer surface of the inner cylinder 50 created by the elevated sections 60 (which may also include the "knurled" surface) prevents the outer element 70 and the inner cylinder from moving relative to each other.

Referring again to FIG. 5, Offset 0 illustrates the offset between the longitudinal axis 80 of the inner cylinder 50 (shown in FIG. 6) relative to the longitudinal axis 85 of the outer element 70, which in FIG. 5 is perpendicular to the page (i.e., extends out of the page). In one embodiment the offset 0 may be about 0.19 inches, but will be appreciated that the amount of offset 0 may vary. It will also be appreciated that FIG. 5 is not drawn to scale, so that the offset 0 may be more clearly illustrated.

Referring now to FIGS. 1-2 and 7, when the SSS kit 5 is installed on the motorcycle frame 25, the stock swing arm pivot shaft 21 is removed, and replacement swing arm pivot shaft 30 is installed. Washers 19 are removed and replaced by asymmetric bushings 20. Each asymmetric bushing 20 fits within each mounting element, or rubber mounts 23 (also known as "cleve blocks"), as shown in FIG. 7, and decrease the "play" or deflection of the rubber mounts 23 that help to pivotally couple the replacement swing arm pivot shaft 30 to the frame 25. That is, the asymmetric bushing 20 "fills" the interior volume of the rubber mount 23 (shown in FIG. 2) so that any deflection of the rubber mount 23 is supported, or resisted by the asymmetric bushing 20. Specifically, as shown in FIG. 2, and indirectly in FIG. 7, each rubber mount 23 includes an interior "cup" or "void" that has a substantially planar base 90 where the washer 19 and nut 24 are located, and a substantially cylindrical wall 95 that extends from the planar base 90. As shown in FIG. 7, the interior volume of the rubber mount 23 is filled by the asymmetric bushing 20, so the shape of the interior volume of the rubber mount 23 is substantially the opposite of the exterior dimensions of the asymmetric bushing 20. In addition, the offset 0 of the longitudinal axis 80 of the inner cylinder 50 relative to the longitudinal axis 85 of the outer element 70 allows the asymmetric bushing 20 to fit within rubber mount 23, as the swing arm pivot shaft (either stock 21 or replacement 30) is asymmetrically located within the interior "void" formed by the planar base 90 and the substantially cylindrical wall 95 of each rubber mount 23.

After installation of the two asymmetric bushings 20, the "stiffness" or spring rate between the replacement swing arm pivot shaft 30 and the frame 25 is increased, thereby reducing the amount of swing arm 22 lateral movement, which of course, reduces the lateral movement of the rear tire, thereby increasing the stability of the motorcycle. However, the "stiffness" is not so great as to allow excessive vibration to transfer through the shaft 21 and into the frame 25, and as a result, the ride quality is maintained. Put differently, there is no additional vibration or stiffness as felt at the feet and hands of the rider. This is, in part, due to the hardness, or lack thereof, of the outer element 70.

As described above, and with reference to the Figures, one embodiment of the SSS kit 5 comprises a motorcycle suspension kit comprising an elongated member comprising two end portions joined by a center section and at least two bushings, each bushing positionable about each elongated member end portion, with each bushing comprising an inner element and an outer element composed of a different material than the inner element, with the inner element asymmetrically located in the outer element. The asymmetric location of the inner element relative to the outer element is achieved by locating a longitudinal axis of the inner element at an offset from a longitudinal axis of the outer element, and the elongated member comprises a substantially cylindrical metal shaft with each end portion comprising an elongate section sized to receive one of the at least two bushings. The bushing inner element comprises a substantially tubular member having a substantially constant inner diameter and a non-constant outer diameter, where the non-constant outer diameter comprises a radial flange located at each distal end of the bushing inner element. An outer surface of the bushing inner element may be selected from a group consisting of a substantially smooth outer surface area and a substantially knurled outer surface area, and the outer element comprises a material having an A scale durometer ranging from 20 to 50.

Another embodiment of the SSS kit 5 comprises a motorcycle suspension kit for removably attaching a motorcycle swing arm to a motorcycle frame, the motorcycle suspension kit comprising a swing arm pivot shaft structured to pivotably couple the motorcycle swing arm to the motorcycle frame, the swing arm pivot shaft comprising two end portions joined by a center section. The SSS kit 5 also includes two asymmetric bushings, with one asymmetric bushing positionable about each end portion of the swing arm pivot shaft, each asymmetric bushing comprising an outer bushing element comprising a substantially circular perimeter and a substantially cylindrical inner bushing element mounted asymmetrically within the substantially circular outer bushing element. The elongated member comprises a substantially cylindrical metal shaft with each end portion comprising an elongate section sized to receive one of the two asymmetric bushings. The inner bushing element comprises a substantially tubular element having a substantially constant inner diameter and a non-constant outer diameter, where the non-constant outer diameter comprises a radial flange located at each distal end of the inner bushing element and the outer bushing element comprises a material having an A scale durometer a range from 20 to 50. The asymmetric mounting of the inner bushing element relative to the outer bushing element is achieved by locating a longitudinal axis of the inner bushing element at an offset from a longitudinal axis of the outer bushing element.

One method for removably attaching the SSS kit to a motorcycle may include the steps of removing a first swing arm pivot shaft (the "stock" or original manufactured part) and the two mounting elements from the motorcycle frame and pivotably coupling an elongated swing arm pivot shaft to the motorcycle frame, the elongated swing arm pivot shaft comprising two end portions joined by a center section. Then, removably positioning two mounting elements substantially about the two end portions of the second swing arm pivot shaft and removably positioning an asymmetric bushing substantially within each mounting element, with each asymmetric bushing comprising an outer bushing element sized to fit substantially within the mounting element and a substantially cylindrical inner bushing element mounted asymmetrically within the substantially circular outer bushing element. Each mounting element includes an interior volume formed by a substantially planar base and a substantially cylindrical wall, with the interior volume filled by each asymmetric bushing. If we now turn to FIGS. 8A-8C, the inventor will introduce a second embodiment of the sway dampening apparatus of the present invention.

Figures 8A, 8B, 8C:
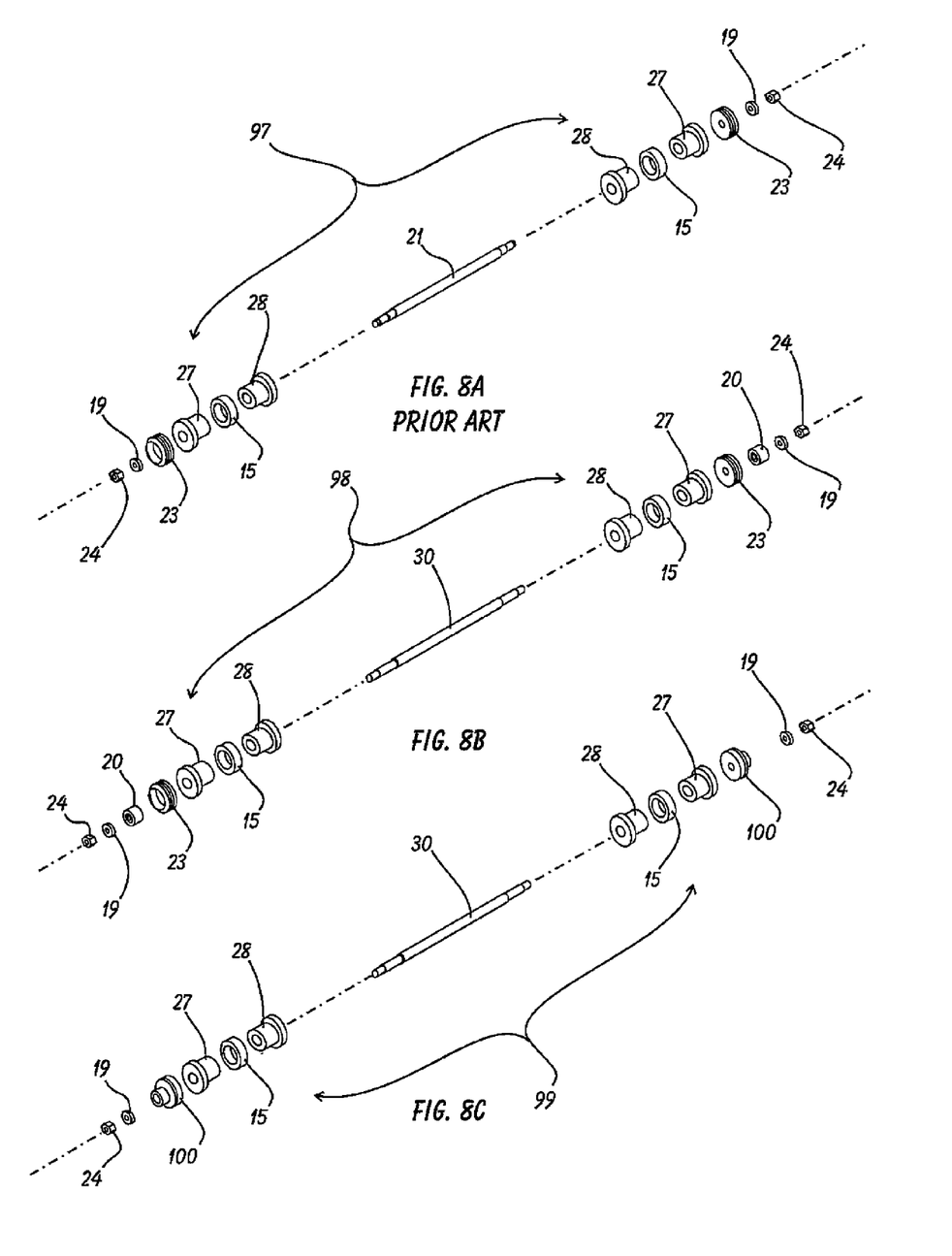
FIGS. 8A, 8B and 8C are exploded perspective views of the OEM pivot shaft assembly, the Parent Pivot Shaft Assembly, and the Symmetrical Pivot Shaft Assembly, respectively.

FIGS. 8A, 8B and 8C are exploded perspective views of the OEM pivot shaft assembly 97, the Parent Pivot Shaft Assembly 98, and a preferred embodiment of the Symmetrical Pivot Shaft Assembly 99 of the present invention.

As indicated above in the Background of the Invention, upon introduction of the SSS 5 in its original form, it has been determined that in certain cases the motorcycle's resultant ride quality can suffer. While the high-speed wobble problem is generally resolved completely, the new stiffness of the engine mount and pivot arm can reveal previously concealed problems with the cycle. While a number of issues have been found to be acting in these cases, the inventor determined that many times the root of the problem stemmed from the original equipment rubber mount 23. In re-using the OEM rubber mount 23, the SSS 5 depended upon the mount 23 to be in like-new condition. Furthermore, defects in the design of the rubber mount 23 were being "bandaged" by the asymmetric bushing 20. What was needed was a complete solution to not only the high speed wobble, but also to the general structural defects introduced by the design of the OEM rubber mount 23.

As previously discussed, in order to implement the parent pivot shaft assembly 98 into an OEM cycle (i.e. one having the OEM pivot shaft assembly 97), the OEM pivot shaft 21 was first replaced with the replacement pivot shaft 30. Secondly, an asymmetric bushing 20 was inserted into the hollow void (see elements 90 and 95 in FIG. 2) within the rubber mount 23, and then assembled onto the replacement pivot shaft 30 along with the other OEM elements depicted in FIG. 8B.

Figure 9A:
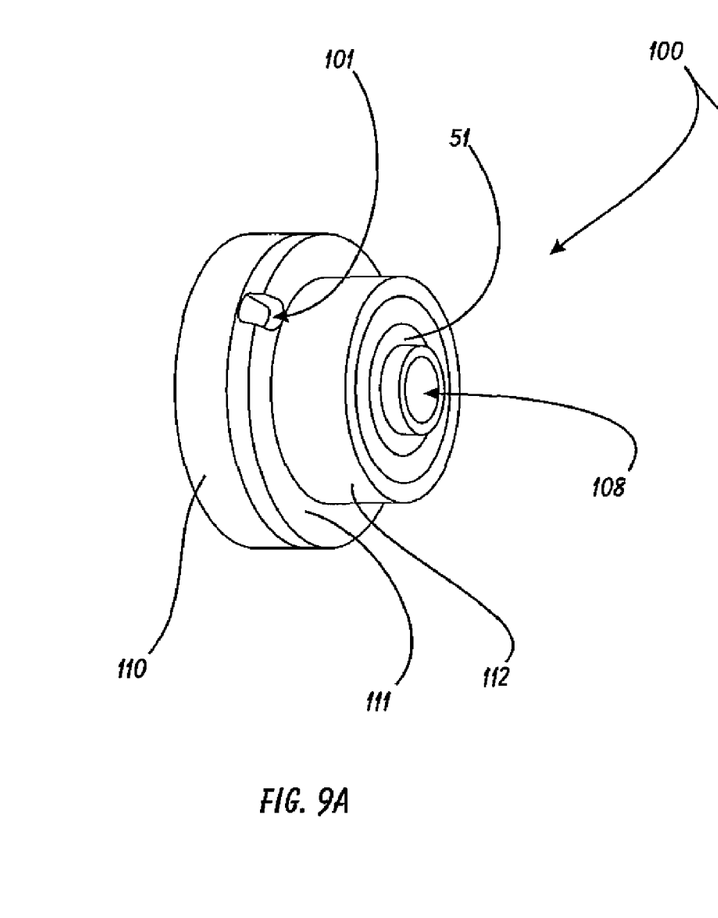
FIGS. 9A and 9B are front and rear perspective views of the preferred embodiment of the Combination Mount and Bushing of the Pivot Shaft Assembly of FIG. 8C.
Figure 9B:
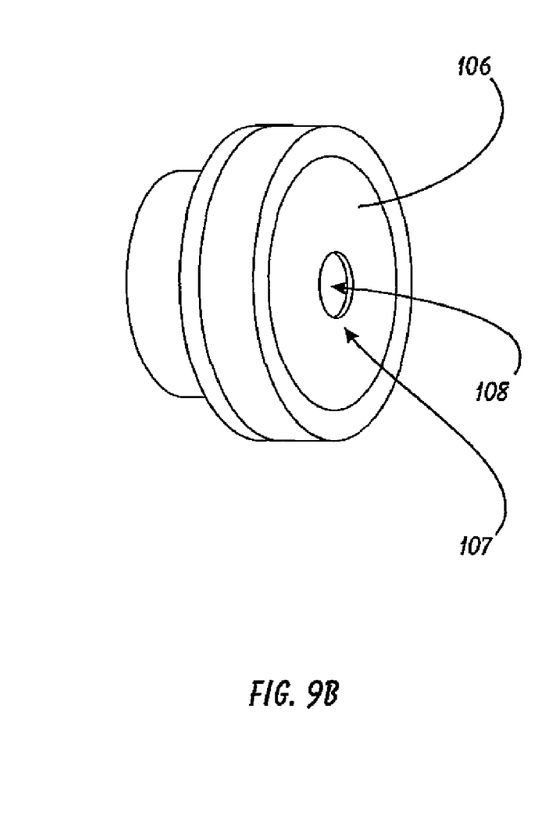

A new device is introduced in the instant invention that resolves any remaining issues related to the OEM rubber mount 23. In order to convert a cycle from the OEM pivot shaft assembly 97 to the symmetrical pivot shaft assembly 99 of the present invention, the OEM pivot shaft 21 is replaced with the replacement pivot shaft 30. Second, the rubber mount 23 (and asymmetric bushing 20, if so equipped) are also removed and replaced with the combination mount and bushing 100 of the present invention. As will be detailed more fully below, the combination mount and bushing 100 not only reduces the number of mechanical elements in the assembly 8B, but also improves the system design by eliminating any design defects inherent in the OEM rubber mount 23 and utilizes advanced materials to improve upon the system ride performance. FIGS. 9A and 9B and the associated description provide additional detail regarding the instant invention.

FIGS. 9A and 9B are front and rear perspective views, respectively, of the preferred embodiment of the Combination Mount and Bushing 100 of the Pivot Shaft Assembly of FIG. 8C. The combination mount and bushing 100 is designed to take the place of the OEM rubber mount 23 (see FIG. 1) and the asymmetric bushing 20 (see FIG. 2), and to further improve the retro-fitted motorcycle's ride quality beyond the level of those two devices.

The mount and bushing 100 is generally circular in cross-section, and is comprised of three distinct, but interconnected, elements: the inner cylinder 51, the stiffening element 112, and the dampening element 110. There is a central bore 108 passing through the geometric center of the mount/bushing 100, in contrast to the design of the OEM rubber mount (see FIG. 1), which has an asymmetrically-located central bore. In order to fully cooperate with the OEM motorcycle frame and other structural to parts, the mount/bushing 100 has a notch 101 formed in it. The notch 101 will align with a protrusion formed in the OEM frame 25 (see FIG. 1), so that no modification of the OEM frame is necessary. A similar notch is provided in the OEM rubber mount 23 (see FIG. 1), but in that case it serves to index the rotational position of the mount 23 (see FIG. 1), so that the (asymmetric) central bore is maintained in its correct orientation.

As shown in FIG. 9B, the combination mount and bushing 100 has a base plate 106 at its rear side (oriented to face the center of the pivot shaft). The base plate 106 is essentially a large metal washer having an aperture 107 formed at its center that is sized in order to allow the replacement pivot shaft 30 (see FIG. 2) to pass therethrough. The aperture 107 is in alignment with the central bore 108. Now that we have completed a general overview of the structure of the combination mount and bushing 100, we will turn to FIG. 10 to delve more deeply into the design details of this novel device.

Figure 10:
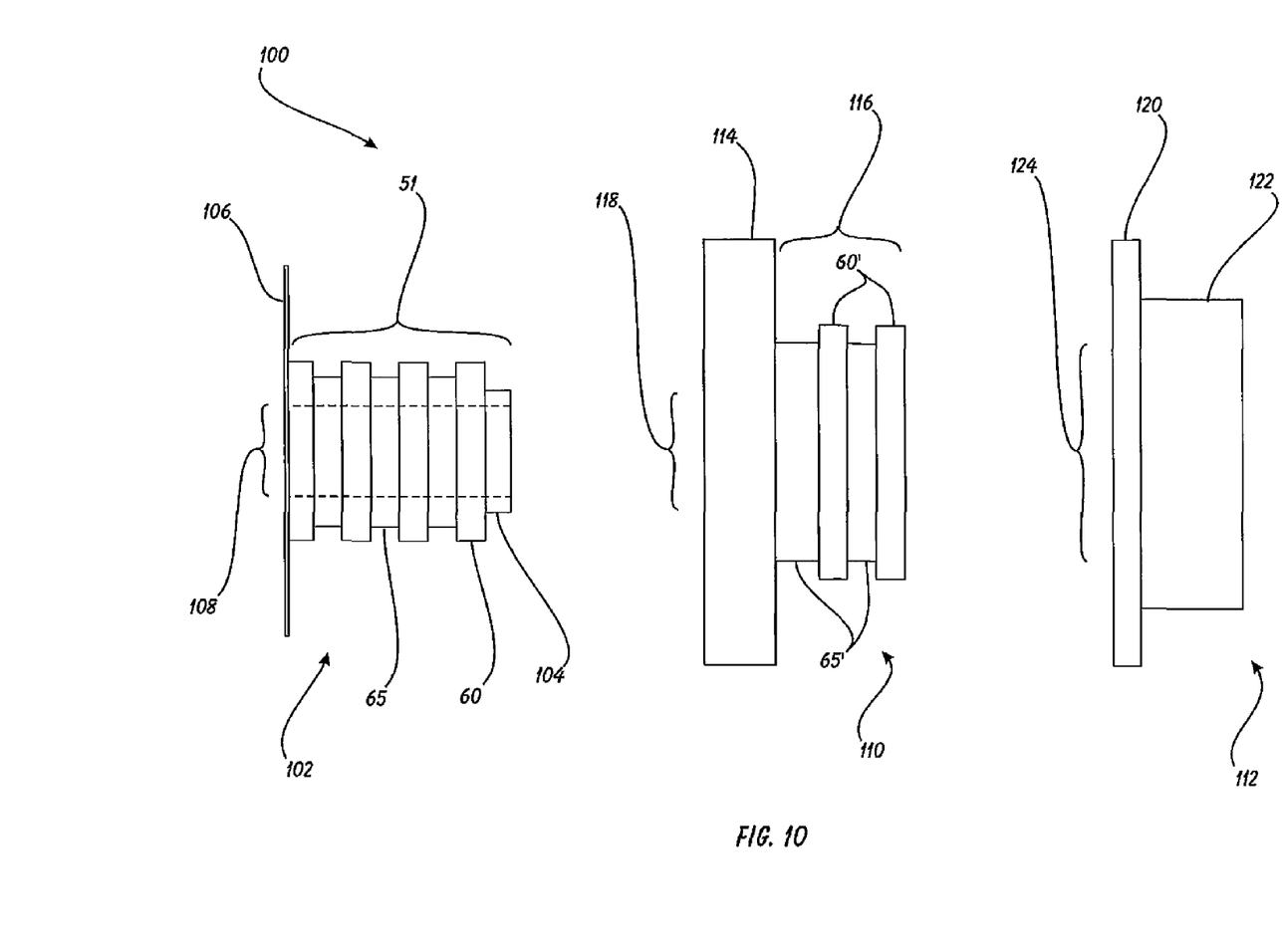
FIG. 10 is an exploded side view of the Combination Mount and Bushing of FIGS. 8C, 9A and 9B.

FIG. 10 is an exploded side view of the Combination Mount and Bushing 100 of FIGS. 8C, 9A and 9B. The inner cylinder assembly 102 is found at the center of the mount/bushing 100. The assembly 102 is, generally, a metallic cylinder having a central bore 108 symmetrically through its center. The assembly 102 is composed of the inner cylinder 51, which like the inner cylinder 50 (see FIG. 6) is defined by a plurality of elevated sections 60 alternating with non-elevated sections 65. These elevated sections 60 are, essentially, raised rings formed along the length of the inner cylinder 51. These rings serve to securely bind the metallic inner cylinder assembly 102 to the dampening element 110 (and by extension also to the stiffening element 112).

The base plate 106 is formed with, or securely attached to, the inner cylinder 51, which also tends to make the mount/bushing 100 a durable package. At the front end (the end opposing the base plate 106), the inner cylinder 51 has a neck portion 104 extending outwardly. As depicted above in FIG. 9A and below in FIG. 11, the neck portion 104 protrudes beyond the end of the stiffening element 112.

The dampening element 110 (which is actually molded around the inner cylinder assembly 102 is defined by a shoulder portion 114 and a neck portion 116. The neck portion 116, like the inner cylinder 51 is defined by a plurality of alternating elevated sections 60' and non-elevated sections 65'. These alternating rings serve to firmly bind the dampening element 110 to the stiffening element 112. The central bore 118 in the dampening element 110 is essentially the same shape as the inner cylinder 51, and is symmetric around the central axis defined by the central bore 108.

The dampening element 110 is formed from a urethane material having a specific hardness property that makes it relatively soft and pliable. Hence this element 110 tends to reduce vibration transmitted between the replacement pivot shaft 30 (see FIG. 2) and the motorcycle frame 25 (see FIG. 1). Testing has revealed that a custom urethane having a Durometer reading of 45 (forty-five) on the Shore A scale performs very well from both a durability and a vibration dampening standpoint.

The stiffening element 112 is also formed from a urethane material, but it is defined by a hardness that is different than that of the dampening element 110. The material of construction of the stiffening element 112 is much harder, durable and wear-resistant than the dampening element 110. It is therefore very well suited for having direct contact with the motorcycle frame 25 (see FIG. 1). It should be noted that the material of the stiffening element 112 is exposed around the periphery of the neck portion 122 of the stiffening element (which engages the motorcycle frame), as well as the face 111 of the shoulder portion (see FIG. 9A).

The stiffening element 112 is defined by a shoulder portion 120 that steps down to a smaller-diameter neck portion 122 at its end. A central bore 124 is defined along the longitudinal axis of the stiffening element 112. Because the bore 124 is actually formed by molding the stiffening element 112 around the hardened dampening element 110, the profile shape of the central bore 124 will of course match the outer shape of the neck portion 116 of the dampening element 110.

Testing has revealed that a particularly desirable formulation of urethane used for the stiffening element 112 has a durometer reading of 90 (ninety) on the Shore A scale. The stiffer/harder material choice also serves to encapsulate the softer material of the dampening element between the stiffening element 112 and the inner cylinder assembly 102 in order to add stability and durability to the shape of the combination mount and bushing 100.

The dampening element 110 and stiffening element 112 may be comprised of at least one material selected from a group consisting of plastics, polymers, polyesters, polyolefins, polycarbonates, polyamides, polyethers, polyethylene, polytetrafluoroethylene, silicone, silicone rubber, rubber, polyurethane, DACRON, TEFLON, polyvinyl chloride, polystyrene, nylon, or latex rubber.

As discussed above in connection with the parent invention, the raised and non-raised portions discussed herein (and depicted as cylindrical rings) may be presented in alternate embodiments. Examples include knurled, spiked, rectangular, or protrusions of other shapes, with the intent being to "lock" the two adjacent elements (e.g. the inner cylinder assembly 102 and dampening element 110) to one another without adhesive or other supplemental mechanical connector(s). Finally, we will turn to FIG. 11 in order to examine the device of the present invention from yet another perspective.

Figure 11:
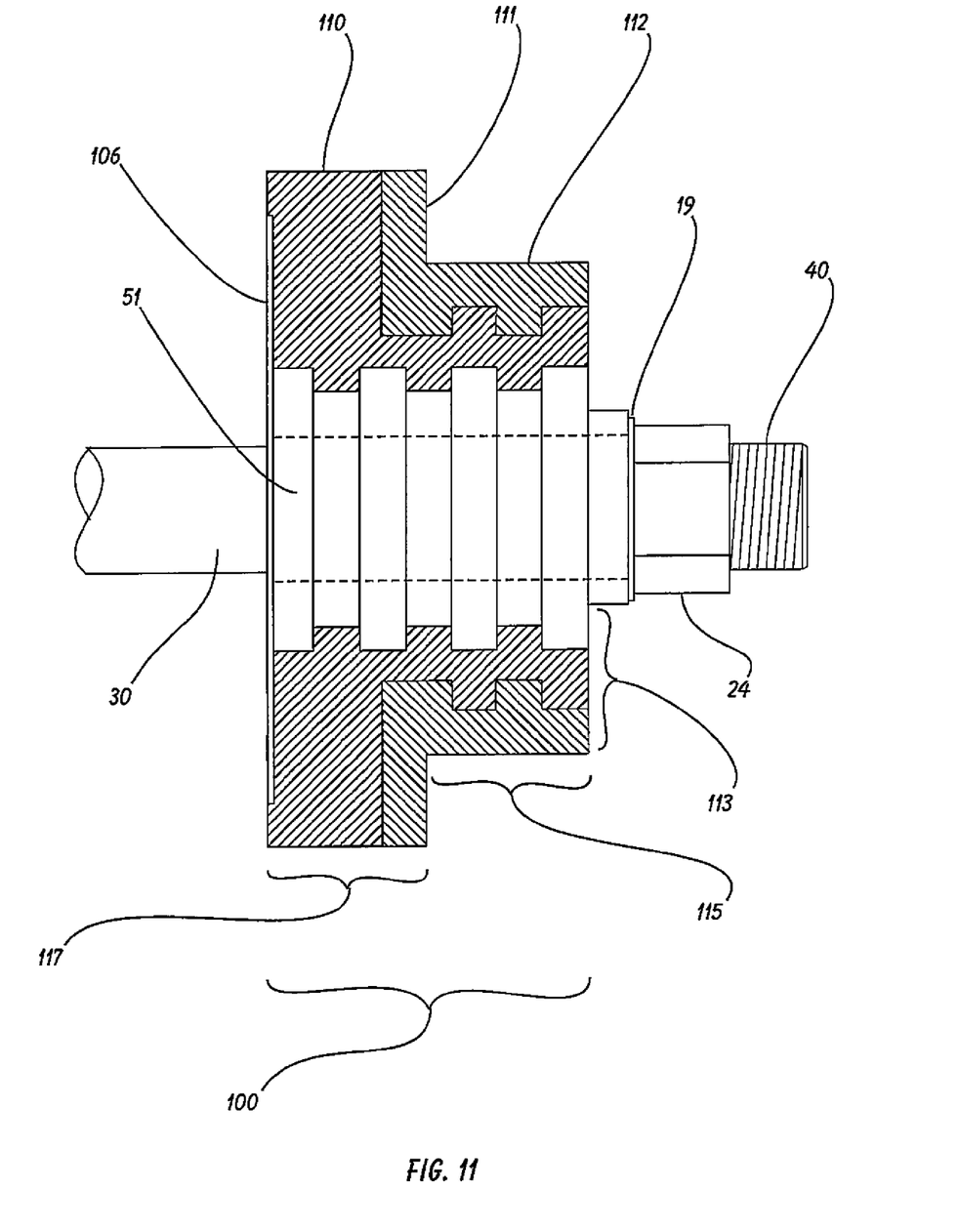
FIG. 11 is a cutaway side view of the Combination Mount and Bushing of FIGS. 8C, 9A, 9B and 10.

FIG. 11 is a cutaway side view of the Combination Mount and Bushing 100 of FIGS. 8C, 9A, 9B and 10. As depicted here, combination mount and bushing 100 is constructed so that the inner cylinder assembly 102 (see FIG. 10), dampening element 110 and stiffening element 112 are combined into a single, solid device. This is currently accomplished through a series of fabrication processes. First, the inner cylinder 51 is machined, cast, or otherwise formed. The base plate 106 is either made with the inner cylinder 51, or attached to it (such as by welding) after both sub-elements are individually completed. Next, the dampening element 110 is molded around the inner cylinder 51 and base plate 106. Finally, the stiffening element 112 is molded around the previously-molded and solidified dampening element 110. As shown, the rings or ridges formed between the individual parts causes those parts to be securely interconnected.

As can by clearly seen in this depiction, the stiffening element 112 (made from hard urethane or the like) "coats" the throat face 111 of the proximal ring portion 117 (proximal in relation to the replacement pivot shaft 30 (see FIG. 2). The hard urethane material also coats the outer wall of the distal ring portion 115. These two portions bear the majority of wear and force from engagement with the motorcycle frame (see FIG. 1). It should also be clear from this view that the softer material that comprises the dampening element 110 is sandwiched between the stiffening element 112 and the inner cylinder assembly (i.e. the base plate 106 and inner cylinder 51). This materials orientation provides the cushioning attributes of the softer material making up the dampening element 110, yet also the durability of the steel inner cylinder assembly 102 (see FIG. 10) and the outer stiffening element 112.

Thus, it is seen that a replacement motorcycle suspension kit is provided that improves the originally manufactured motorcycle suspension. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A motorcycle suspension kit, comprising:
an elongated member comprising two end portions joined by a center section;
at least two combination mount and bushing devices, each said combination device positionable about each elongated member end portion, with each combination device comprising an inner element, a dampening element and a stiffening element, said three elements made from relatively different materials, and said dampening element partially encased by said stiffening element and said inner element partially encased by said dampening element;
each said combination device further defines a proximal ring portion forming a first circular circumference defining a first diameter, and a distal ring portion forming a second circular circumference defining a second diameter, said first and second diameters being unequal;
said proximal ring portion formed in part from said dampening element and in part from said stiffening element, said devices further comprising a base plate attached to said inner cylinder to form an inner cylinder assembly, said base plate adjacent to an end of said inner element and said dampening element, and said proximal ring portion further defined by an outer peripheral face, said outer peripheral face defined in part by said dampening element and in part by said stiffening element.

2. The motorcycle suspension kit of claim 1, wherein said combination mount and bushing defines a proximal face opposing a device face, said proximal face defined in part by said base plate and in part by said dampening element and further defined by a central aperture in said base plate.

3. The motorcycle suspension kit of claim 2, wherein said device face is defined in part by said inner element, in part by said dampening element, and in part by said stiffening element.

4. The motorcycle suspension kit of claim 3, wherein said inner cylinder is defined by a central bore in axial alignment with said inner cylinder, said inner cylinder further defined by an outer non-smooth surface engaging said dampening element.

5. The motorcycle suspension kit of claim 4, wherein said dampening defines a central bore engaging said outer non-smooth surface of said inner cylinder, and an outer surface defined in part by an outer peripheral surface defining part of said proximal ring portion outer surface and an encased peripheral surface engaging said stiffening element.

6. The motorcycle suspension kit of claim 5, wherein said stiffening element defines a central bore engaging said encased peripheral surface of said dampening element, an outer proximal peripheral surface defining part of said proximal ring portion outer surface and an outer distal peripheral surface defining said distal ring portion outer surface.

7. The motorcycle kit of claim 6, wherein said proximal ring portion outer surface and said distal ring portion outer surface are interconnected by a throat face.

8. The motorcycle suspension kit of claim 1, where the elongated member comprises a substantially cylindrical metal shaft with each end portion comprising an elongate section sized to receive one of the at least two combination mount and bushing devices through a central bore formed axially therethrough said devices.

9. The motorcycle suspension kit of claim 1, where said inner element comprises a substantially tubular member having a substantially constant inner diameter and a non-constant outer diameter.

10. A motorcycle suspension kit, comprising:
an elongated member comprising two end portions joined by a center section;
at least two combination mount and bushing devices, each said combination device positionable about each elongated member end portion, with each combination device comprising an inner element, a dampening element and a stiffening element, said three elements made from relatively different materials, and said dampening element partially encased by said stiffening element and said inner element partially encased by said dampening element;
each said combination device further defines a proximal ring portion forming a circular circumference, said proximal portion formed in part from said dampening element and in part from said stiffening element, said devices further comprising a base plate adjacent to an end of said inner element and said dampening element; and
wherein said dampening element comprises a hardness of between 30 and 55 on the Shore A scale, and said stiffening element comprises a hardness of between 70 and 105 on the Shore A scale.

11. A method of removably attaching a motorcycle swing arm pivot shaft to a motorcycle frame, the method comprising the steps of
pivotably coupling an elongated swing arm pivot shaft to the motorcycle frame, the elongated swing arm pivot shaft comprising two end portions joined by a center section; and
removably positioning a combination mount and bushing element over each said end portion, with each combination device comprising an inner element, a dampening element and a stiffening element, said three elements made from relatively different materials, and said dampening element partially encased by said stiffening element and said inner element partially encased by said dampening element, said combination mount and bushing elements each further defining a proximal ring portion defining a generally circular cross-section and having a peripheral face formed in part from said dampening element and in part from said stiffening element, a distal ring portion having defining generally circular cross-section and having an outer peripheral face formed in part from said dampening element and in part from said stiffening element and a face generally perpendicular to, and interconnecting said proximal ring portion face and said distal ring portion face, said generally circular cross-sections of said distal and proximal portions being of unequal diameters, said devices further comprising a base plate adjacent to an end of said inner element and said dampening element, said base plate attached to said inner cylinder to form an inner cylinder assembly.

12. The method of claim 11, wherein each said combination mount and bushing of said removably positioning step defines a proximal face opposing a device face, said proximal face defined in part by said base plate and in part by said dampening element and further defined by a central aperture in said base plate.

* * * * *